(12) United States Patent
Elam

(10) Patent No.: US 7,097,133 B2
(45) Date of Patent: Aug. 29, 2006

(54) ARTICULATED FOLDING WING STRUCTURE AND METHOD

(75) Inventor: Daryl B. Elam, Benson, AZ (US)

(73) Assignee: Raytheon Company, Lexington, MA (US)

(*) Notice: Subject to any disclaimer, the term of this patent is extended or adjusted under 35 U.S.C. 154(b) by 5 days.

(21) Appl. No.: 10/922,047

(22) Filed: Aug. 19, 2004

(65) Prior Publication Data

US 2006/0108469 A1 May 25, 2006

(51) Int. Cl.
*F42B 15/01* (2006.01)
(52) U.S. Cl. .................. 244/3.29; 244/99.2; 244/3.27; 244/131; 244/49
(58) Field of Classification Search ........... 244/3.27, 244/3.28, 99.2, 49, 45 R, 131, 46, 3.29, 159.5, 244/172.7; 52/108, 645, 646, 84; 212/300; 248/162.1, 166; 135/132, 133, 908; 403/62, 403/65, 119, 120, 164
See application file for complete search history.

(56) References Cited

U.S. PATENT DOCUMENTS

| | | | | |
|---|---|---|---|---|
| 3,173,629 A | * | 3/1965 | Uhor | 244/46 |
| 3,525,483 A | * | 8/1970 | Alstyne | 244/172.6 |
| 4,024,957 A | * | 5/1977 | Schleis | 212/300 |
| 6,488,435 B1 | * | 12/2002 | Janson | 403/71 |

* cited by examiner

*Primary Examiner*—Peter M. Poon
*Assistant Examiner*—T D Collins
(74) *Attorney, Agent, or Firm*—Renner, Otto, Boisselle & Sklar LLP

(57) ABSTRACT

An articulated wing (20) is readily deployable from a stowed configuration that occupies minimal volume to an extended configuration for flight. The wing (20) includes a frame (24) having a pair of beams (30) spaced by one or more ribs (36), and a flexible covering material (26) over the frame (24) that defines the surface of the wing (20). Each beam (30) typically has multiple segments (40), and each segment (40) is pivotally connected to an adjacent segment (40) at a joint (42). A flexible actuation line (52) extends past each joint (42) and is attached to a portion of the beam beyond the joint. The beam (30) also includes portions that act as stops (46). The stops (46) limit the range of angular motion through which the respective segments (40) can rotate relative to one another. Consequently, when tension is applied to the line (52), the segments (40) rotate until respective stops (46) prevent further rotation. Tension in each line (52) keeps the wing (20) in its extended configuration.

16 Claims, 4 Drawing Sheets

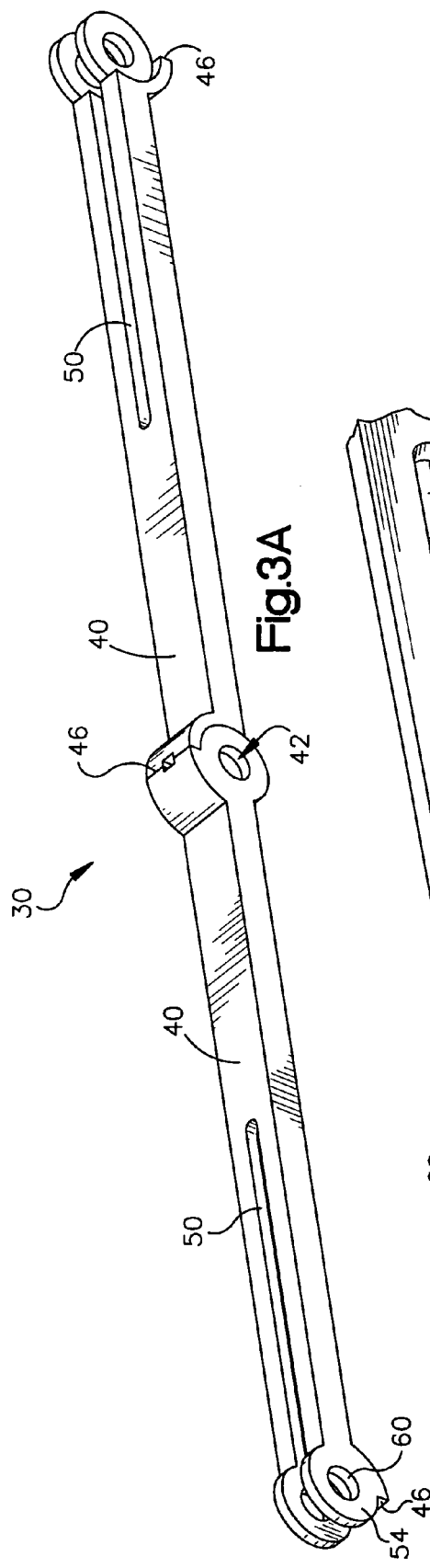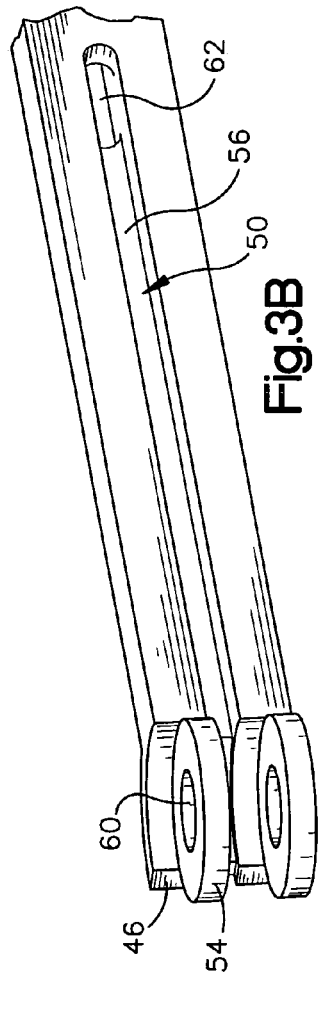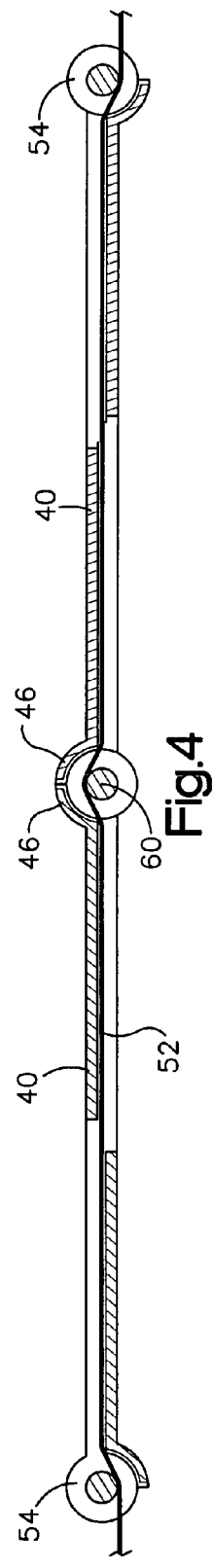

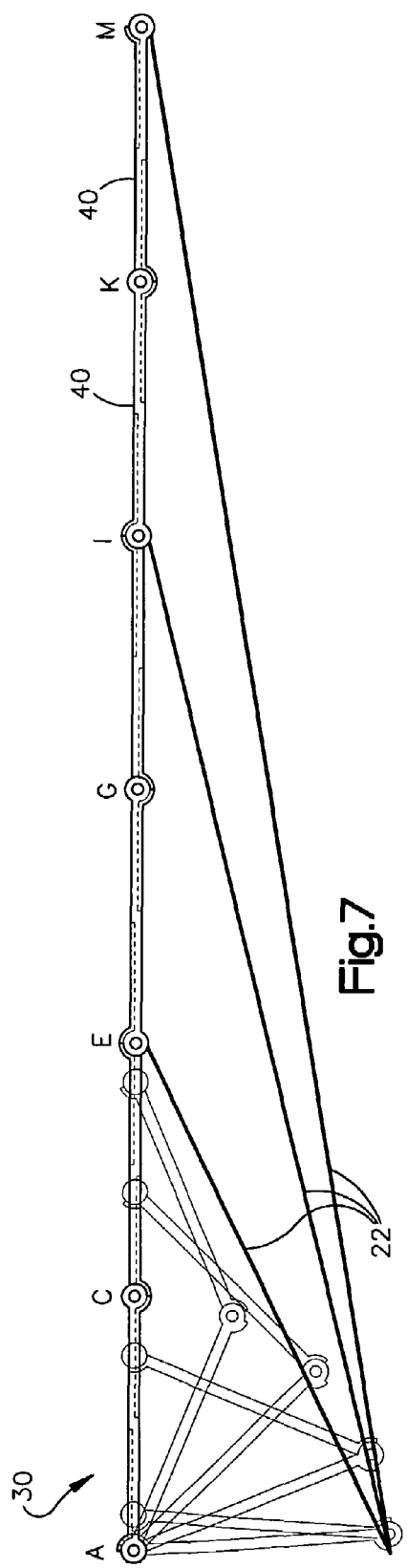
Fig.7
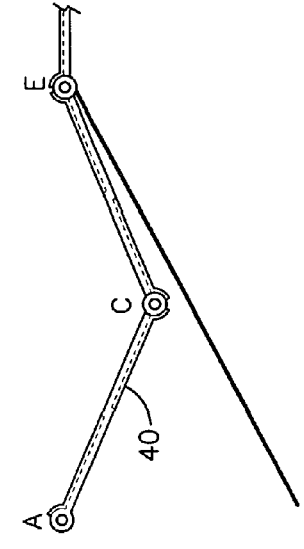
Fig.8D
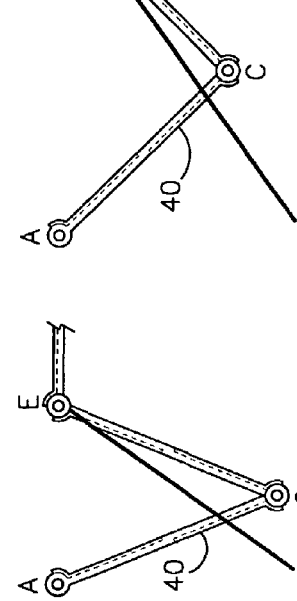
Fig.8C
Fig.8B
Fig.8A

ARTICULATED FOLDING WING STRUCTURE AND METHOD

The inventor developed this invention in cooperation with a department of the U.S. Government; therefore, the U.S. Government might have certain rights to this invention.

FIELD OF THE INVENTION

The present invention is related to an aerial vehicle having wings that are stowable and can be deployed as lifting surfaces for flight, and in particular, to a folding wing structure and a method for deploying such a structure.

BACKGROUND

An aerial vehicle, such as a missile, projectile or unmanned aerial vehicle (UAV), typically is launched from either a tube or a rail. Such a vehicle is very difficult to launch ballistically (i.e. without wings functioning as primary lifting surfaces), and then later in the flight to deploy wings that can function as primary lifting surfaces for non-ballistic flight.

Past attempts to provide wings or wing structures that can be deployed during flight have included traditional wing structures that unfold or swivel out from an envelope within a fuselage portion of the vehicle. Other past attempts include dividing traditional wing structures into folding sub-panels, either spanwise or chordwise, for more volumetrically efficient storage in the space available within the fuselage. These wing structures are typically retracted into the fuselage of the vehicle using various pivots, hinges and sliding mechanisms, and generally also require intricate mechanisms for folding, deploying and operating the wing structure. In general, these past attempts often have resulted in wing structures that are complex, have problems with reliability, are expensive, and due to volume constraints in the fuselage these wing structures are limited in the maximum wing surface that they can provide. This latter problem is most evident when relatively low flight speeds are desired.

Relatively low flight speeds generally require larger wing surfaces to provide enough lift to sustain the aerial vehicle's flight. Because of these size requirements, it is often difficult to store these wing structures within the fuselage. When stored, these wing structures generally consume a volume that is the same as or greater than the volume they consume when they are deployed. As the size of the aerial vehicle is reduced, it becomes increasingly difficult and inefficient to store the wing structures within the fuselage.

Since the wing size is limited by the available storage space within the fuselage, these collapsible wing structures generally only support aerial vehicles traveling at relatively high flight speeds. These higher flight speeds result in greater forces acting on the wing structures during flight, however, which in turn increases the structural requirements necessary to support the increased forces acting on the wing structures.

Previous attempts at making folding wings for non-ballistically launched aerial vehicles typically required traditional reinforcing structures such as trusses and spars inside the wing structure, while also using hinges or pinned joints for folding or stowing the wing structure. This often was due to the larger wing area required for a non-ballistic take-off from the ground. In many cases these wing structures were deployed by personnel on the ground using equipment that was not part of the vehicle. The vehicle typically was then activated to take off from a runway like a conventional airplane.

SUMMARY

The present invention provides a foldable wing that can be extended from a compact stowed configuration to an extended configuration that occupies a relatively larger volume. Moreover, the mechanism for extending the wing is relatively inexpensive, compact and reliable. The wing can be deployed automatically during flight and can be adapted to higher or lower flight speeds. In addition, the concepts embodied in the wing can be applied to any structure that needs to be stowed and then extended, and are not limited to a wing of an aerial vehicle.

Specifically, the present invention provides an articulated wing that is readily deployable from a stowed configuration that occupies a minimal volume to an extended configuration that takes up a relatively larger volume for flight. The wing includes a frame, and a flexible covering material over the frame that defines the surface of the wing. The frame has a pair of segmented beams spaced by one or more ribs. Articulated beams are typically near a leading edge and a trailing edge of the wing, respectively, and the ribs define a cross-sectional shape of the wing. Each beam has multiple segments, and each segment is pivotally connected to an adjacent segment at a joint. A flexible actuation line is used to extend the wing from its stowed configuration. The actuation line extends past each joint and is attached to a portion of the beam beyond the joint. The beam also includes portions that act as stops and limit the range of angular motion through which the respective segments can rotate relative to one another. The actuation line is arranged relative to the stops such that when tension is applied to the line, the segments rotate until respective stops prevent further rotation. Tension maintained in the line keeps the beam, and thus the wing, in its extended configuration.

Each beam includes a plurality of segments that are pivotally connected together at respective joints between adjacent segments for rotation about axes passing through the joints, a stop at each joint that limits the rotation of adjacent segments, a flexible actuation line that extends past each joint and is connected to the beam such that applying tension to the line causes the segments to rotate until each segment engages respective stops thereby deploying the beam from a retracted position to an extended position, a plurality of ribs spanning the distance between the segments, and a covering material extending over the segments and ribs that forms a substantially continuous surface. The rib typically is attached to the covering material. An aerial vehicle including such a wing can further include a plurality of braces that support the wing in at least one extended position.

Accordingly, the present invention also provides an aerial vehicle having a fuselage and an articulated wing as described above mounted to the fuselage. Naturally, it follows that the present invention also provides a method that includes a step of extending an articulated wing by applying tension to a flexible line connected to a beam in the frame of the wing. Thus, the present invention is not limited to aerial vehicle applications, however, and also provides an articulated beam apart from its application in the embodiment of a wing.

The present invention also includes any apparatus that includes a beam having at least one segment that is rotatable about an axis that extends through a joint, a stop that limits the segment's angular range of rotation, and a flexible line connected to the beam that extends past the joint, whereby applying tension to the line will cause the segment to rotate about the axis until stopped by the stop.

A frame can be formed from at least two spaced apart beams with multiple segments in each beam and at least one rib extending between the beams, as in the wing described above. The apparatus might further include one or more braces, which can include cables, that support at least one segment, and thus the beam, in an extended position.

Each segment of the beam includes a guideway for the line. The guideway includes a passage from one side of the segment to an opposite side of the segment and a channel that extends parallel to the length of the segment. Each segment generally is symmetric about a mid-length point.

The stop associated with each segment can include an integral part of one or more segments. In one embodiment, the stop is formed by elements of a joint, including portions of at least one of the pair of segments connected at the joint. Typically, at least one of the stops allows a segment to at least one of rotate through a maximum of approximately one hundred-eighty degrees or rotate through a maximum of approximately ninety degrees or rotate in an opposite direction from the direction of rotation for an adjacent segment.

The flexible actuation line running through the beam includes at least one cable, and can include multiple cables, each terminally attached to a different segment. This latter arrangement allows the wing segments to be selectively extended.

The articulated folding wing provided by the present invention is applicable to small aerial air vehicle applications that require superior packaging efficiency without unnecessarily compromising airframe performance. The compact nature of the folding wing reduces the stowage volume of the wing; thereby improving the volumetric efficiency of the overall package within which the wing is stowed. This volumetric efficiency is necessitated by increased demand for small, portable aerial vehicles. For these vehicles to be carried by an individual, reduced weight and volume are an added advantage.

The foregoing and other features of the invention are hereinafter fully described and particularly pointed out in the claims, the following description and annexed drawings setting forth in detail a certain illustrative embodiment of the invention, this embodiment being indicative, however, of but one of the various ways in which the principles of the invention may be employed.

BRIEF DESCRIPTION OF THE DRAWINGS

FIGS. 3A–3B are respective front and rear perspective views of exemplary segments of the frame of FIG. 2.

FIG. 4 illustrates how pulling on the actuator lines creates torque about the pivot points.

FIG. 7 is a side view of the wing of FIG. 6 with a time-lapse view of the first (left) two folds of the wing during deployment.

FIG. 8 is an enlarged view of the time-lapse images of FIG. 7.

DETAILED DESCRIPTION OF THE INVENTION

Figure 1:
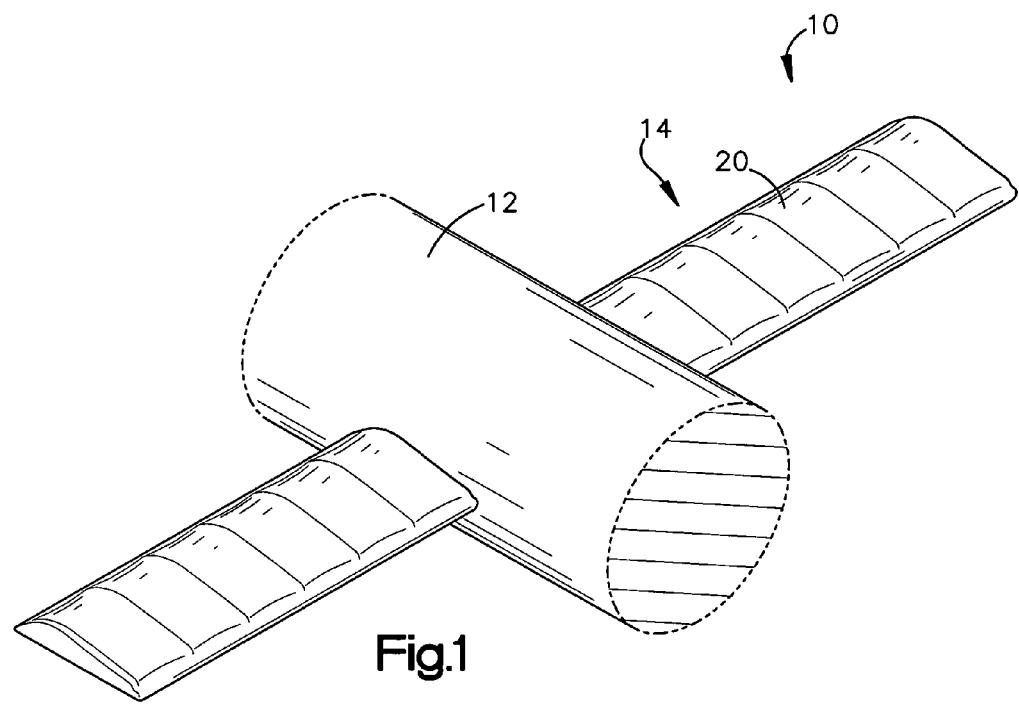
FIG. 1 is a schematic view of an aerial vehicle having articulated wings in accordance with the present invention.
Figure 2:
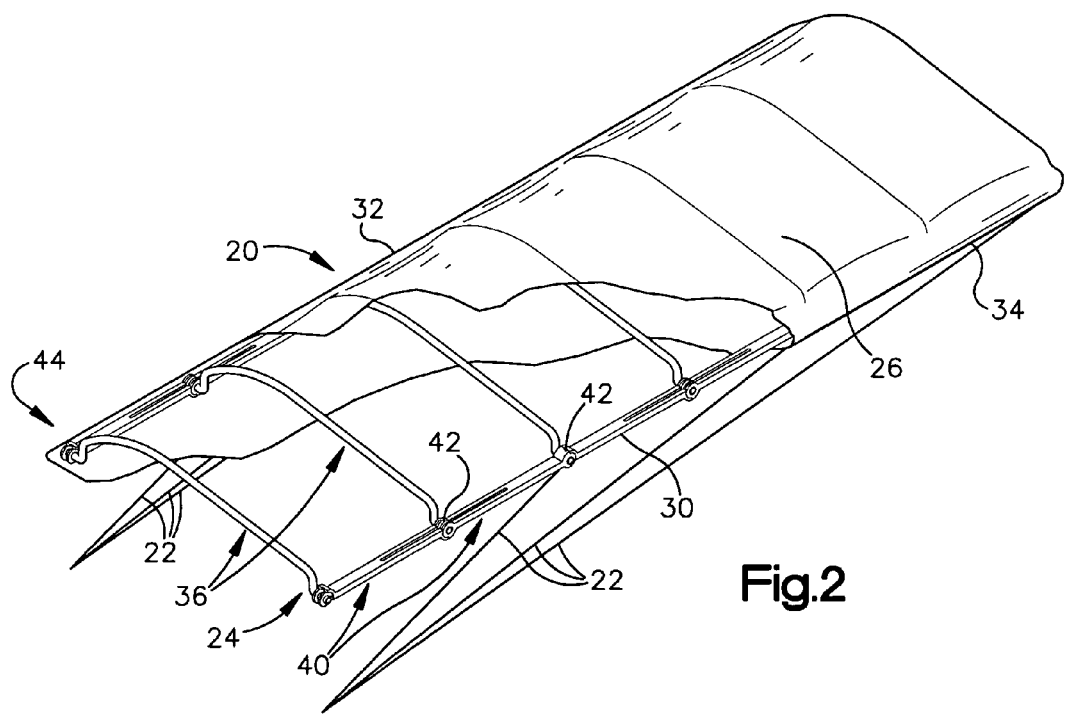
FIG. 2 is a partial perspective view of a wing provided by the present invention in an extended position.

As generally shown in FIGS. 1 and 2, the present invention provides an articulated wing 20 that is readily deployable from a compact stowed configuration that occupies minimal volume to an extended configuration that occupies a relatively larger volume. The wing 20 typically is deployable in flight.

The wing 20 includes a frame 24 having a pair of beams 30 spaced by one or more ribs 36, and a flexible covering material 26 over the frame 24 that defines a substantially continuous surface of the wing. Each beam 30 typically has multiple segments 40, and each segment is pivotally connected to an adjacent segment at a joint 42. A flexible actuation line 52 extends past each joint 42 and is attached to a portion of the beam 30 beyond the joint. The beam 30 also includes portions that act as stops 46. The stops 46 limit the range of angular motion through which the respective segments 40 can rotate relative to one another. The line 52 is arranged relative to the stops 46 such that when tension is applied to the line, the segments 40 rotate about the pivots until respective stops prevent further rotation. Tension in each line 52 keeps the wing 20 in its extended configuration.

The wing provided by the present invention can be tailored for a variety of applications by changing the wing's shape, materials, dimensions and control mechanisms. The stowed wing can be zig-zag folded into a space within the fuselage envelope that is sized to receive the root cord of the wing. As a result, the invention also provides a volumetrically-efficient stowed configuration since the wing folds to occupy much less volume when stowed than when deployed. In addition, the shape of the stowage compartment can be different than the shape of the deployed wing, further enhancing its volumetric efficiency.

Referring specifically to FIGS. 1 and 2, the present invention provides an aerial vehicle 10, such as a missile, projectile or an unmanned aerial vehicle (UAV), having a fuselage 12 to which a wing assembly 14 is mounted. The wing assembly includes an actuator (not shown) and the wing 20 referred to above. In flight, the wing 20 can have a fixed geometry, or the wing can have movable control surfaces either attached to or incorporated into the wing. The wing assembly 14 also includes optional bracing elements 22 extendable between the fuselage 12 and the wing 20 to provide additional support, if necessary for a particular application.

As noted above, the wing 20 includes a frame 24 covered by a flexible skin or covering material 26. The flexible covering material 26 over the frame 24 defines the surface of the wing 20 and can be similar to the covers used on the wing structures of hang gliders and ultralight aircraft, for example, such as woven fabric or plastic films. This covering material 26 can be fabricated by sewing, molding, fusing or using adhesives to arrive at the appropriate shape to fit the wing frame 24. FIG. 1 depicts a double-surfaced wing covering. If the application allows then the covering material can be primarily a single layer upper surface.

The frame 24 includes at least two articulated beams 30, one of which is near each of a leading edge 32 and a trailing edge 34 of the wing, respectively. The wing frame 24 also includes at least one rib 36 that extends generally chordwise between the beams 30 and defines a cross-sectional shape of the wing 20.

The beams 30 extend spanwise, generally extending outward from the fuselage 12. These beams 30 are interchangeably referred to as spars, and segments 40 that make up the beams are interchangeably referred to as spar segments. Each beam 30 includes a plurality of segments 40 that are pivotably connected together at respective joints 42 between adjacent segments for rotation about axes passing through the joints.

The wing's ability to fold in zig-zag style for stowage into a compartment located at the wing root 44, generally adjacent the fuselage 12, is made possible by the wing's ability to fold into panels that hinge on chordwise axes. Each panel is bounded on the leading edge and trailing edge of the wing by spar segments 40, and on each chordwise edge by the pivotable ribs 36.

The spar segments 40 generally have a pivot joint 42 at both ends, mechanical features about each pivot joint that limit the rotational range of motion (stops) 46 (FIG. 3A), and grooves 50 (FIG. 3A) along their length in which actuation lines 52 lay.

FIGS. 3A and 3B, for example, shows several par segments 40. The circular features 54 resembling parallel flat washers define a pivot operture 60 through which rib end features protrude. These pivots can be designed as shown with appropriate offsets such that all spar segments 40 in a wing 20 can be identical. Each of the illustrated segments 40 is symmetrical about its mid-length point. By simply reversing the orientation of each spanwise spar segment, the pivot ribs 36 (FIG. 5) join the spar segments 40 together to produce a straight spar 30. For the actuation line 52, a groove 56 is provided along the face of each spar segment 40 to the mid-length point of the spar segment, at which point the groove passes through to the opposite face and continues symmetrically to the other end of the spar segment. This groove 50 also can be referred to as a guideway that has a channel 56 that extends parallel to the length of the segment 40 on both sides of the segment, and a passage 58 through the segment that connects the channels. The passage 62 typically is near a midpoint of the segment 40.

Each joint 42 between adjacent segments 40 of the beam 30 includes a stop 46 that limits the range of angular rotation of the segments. In the illustrated embodiment, the stop 46 includes an integral part of the segment 40, specifically elements of a joint 42, including portions of the pair of segments connected at the joint 42.

At least one stop 46 allows a segment 40 to rotate through a maximum of approximately one hundred-eighty degrees. Additionally or alternatively, at least one stop 46 allows a segment 40 to rotate through a maximum of approximately ninety degrees. In the illustrated embodiment, the steps allow each segment 40 to rotate in an opposite direction from the direction of rotation for an adjacent segment. Typically a rib 36 is supplied at each end of each segment 40 in the beam 30.

The covering material 26 provides means for positioning the pivot ribs 36 into their proper orientation in vertical planes as shown in FIG. 2. Suitable means include sewing batten pockets into the upper wing skin 26 to hold the ribs 36, bonding the upper surface of the skin to the ribs 36 in the right places or attaching spanwise flexible tapes to the ribs 36 and anchoring them at the wing root (left side in FIG. 2).

Referring now to FIG. 4, at least one actuation line 52 is threaded through the segments 40 of each beam 30. The flexible line 52 can include at least one cable, chain, rope, strand or any other means for transmitting tension that is flexible enough to bend around the joints in the beam in the stowed configuration. The actuation line 52 extends past each pivot joint 42 such that applying tension to the line creates a torque at the pivot joint, which in turn causes the spar segments 40 to rotate until stopped. By pulling on the line, a torque is generated at each pivot joint 42 causing the segments to move from their stowed, zig-zag folded positions into their fully deployed, straight out cantilever beam positions. If multiple cables are used, along with wire brace elements 22 for each cable set, then by selectively pulling on certain cables, the wing 20 can be deployed in partial-span segments to provide for incremental variable wing area. This would make it possible to selectively deploy portions of the total wing area for aerodynamic reasons according to the flight mission requirements. It is expected that the wing 20 can be deployed in flight, such as at a ballistic apogee, although the wing could be deployed before flight in some applications.

Due to the geometry of the actuation line grooves 50 and pivot joints 42, when the ends of the actuation lines 52 that terminate within the fuselage 12 are pulled in coordination with each other, the wing panels unfold due to the torque forces produced at each spar segment pivot joint 42. This provides a simple way to deploy the wing 20 using tension forces on the actuation lines 52 (for leading and trailing edges 32, 34 of the wing).

Any suitable means of generating pulling tension on the actuation line 52 will produce the described effects, and can include such actuators as one or more of gearmotors configured like cable winches, hydraulic or pneumatic cylinders or motors, piezoelectric actuators, via motorized twisting of stranded cables (shortening the helix angles), or by heating bimetallic metals, for example. The amount of tension required is determined by the required stiffness of the wing as it is subject to flight loads. The wing stiffness results from a combination of the mechanical properties of the materials in the spar segments 40 (such as metal, composites or plastics) the dimensions and shape of individual segments, and the geometry of the path traveled by the actuation line 52. When the line 52 follows a larger radius around the pivot joints 42, a greater torque is produced per unit of tension. In any implementation of this invention there will be trade-offs between this pivot radius, aerodynamic smoothness, as the wing skin 26 will have a bump as it passes over a pivot joint 42, and tension in the actuation line 52.

Figure 5:
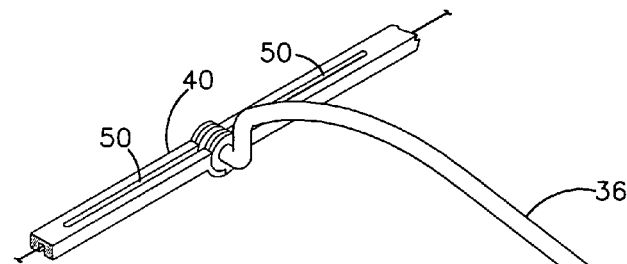
FIG. 5 is an enlarged perspective view of a portion of the wing of FIG. 2.

FIG. 5 shows a typical rib 36, which serves the dual purpose of providing a pivot point for adjacent segments 40 and also defines a cross-sectional airfoil shape beneath the frame-covering material 26. Thus the rib 36 gives the wing 20 its cross-sectional airfoil shape when the wing is deployed. The ends of the rib 36 are inserted into the holes 60 (FIG. 3A) in the ends of adjacent spar segments 40 to act as pivot pins. The ribs 36 can be mechanically secured in position with common fastening techniques (adhesive, clips, pins, screws, etc.), or the covering material 26 that acts as wing skin can be stretched tight enough to preclude the pivot rib 36 disengaging the spar segments 40 once the covering material is in place. For the case shown in FIG. 5, this joint 42 would fold downward since the actuation lines 52 go under the pivot rib ends.

Figure 6:
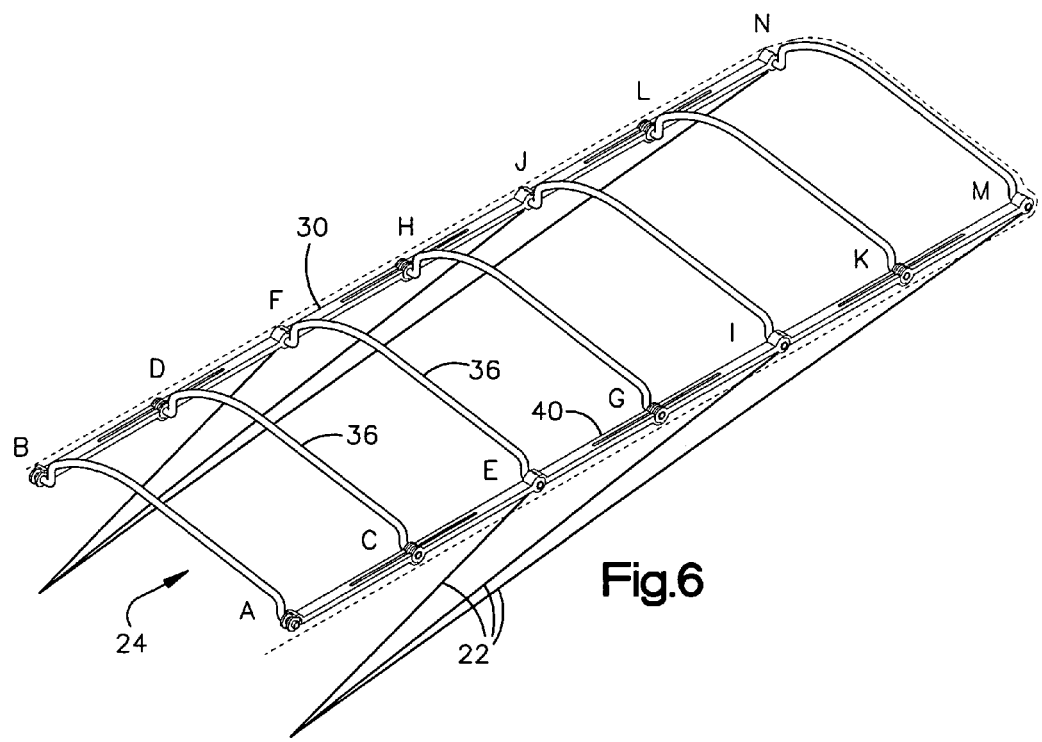
FIG. 6 is a perspective view of a wing provided by the present invention with the wing's covering removed from its frame and a plurality of braces that support the extended wing frame.

The spar segments 40 of a wing 20 embodying this invention have pivot joints 42 at both ends of each segment 40, which means that such a wing often must be externally braced, as shown in FIGS. 1 and 6, for example. The optional bracing elements 22 in the wing assembly 14 are attached to the fuselage structure 12 or to one or more kingpost struts near the root end 44 of the wing adjacent the fuselage, and at least one spanwise location on the beam 30. The bracing elements 22 can include wires, cables, chains, or collapsible struts. Since the spanwise routing of the actuation lines 52 alternates going over and then under the pivot joints 42, then for a wing 20 subject to predominantly positive G-loads during flight, it is most appropriate to attach the brace wires 22 at the pivot joints 42 (as shown in FIG. 1), which otherwise might open up if positive lift exceeded the torque forces produced by the actuation lines 52. For wings 20 subject to large negative G-loads, additional brace wires 22 can be added from a higher anchor point and leading to various pivot joints 42 as needed. For lightly loaded structures a "half-segment," which can include an end portion of a spar segment 40, rigidly attached to the fuselage 12 generally allows the wing 20 to be self-supporting without any brace wires 22. A combination of the externally braced and self-supporting configurations also can be implemented.

The present invention also provides a method for extending the wing 20 that includes at least the step of extending an articulated beam 30 by applying tension to a flexible actuation line 52 connected to the beam. FIGS. 4, 7 and 8 show how pulling on the actuation line 52 creates torque about the pivot joints 42. The upper portion of FIG. 4 shows a phantom view of two spar segments 40 and an actuation line 52. The lower portion shows the same spar segments 40 as a sectioned view. In the lower portion the spar segment 40 at the centerline of its section is shown as typified at "A."

To deploy and maintain a deployed or extended state of the wing 20, the actuation lines 52 would be pulled as indicated by the arrows at "P." The actuation line 52 is confined by the walls of the grooves 56 in the spar segments 40 and by the cylindrical ends of the pivot ribs 36 that act as hinge pins. Pulling tension in the lines 52 generates a rotational torque indicated by arrows B1 and B2 about the pivot joints 42. This causes the spar segments 40 to rotate at their pivot joints until the stops 46 (rotation limit features) of adjacent spar segments 40 come into mutual contact at "C." Maintaining tension in the lines 52 will maintain the torques at the pivot joints 42 and provide stiffness and stability to the beams 30 and thus to the wing 20.

FIGS. 6–8 shows a view of a wing assembly 14 without the wing skin covering material 26. In FIG. 6 the pivot joints 42 have been lettered A through N. In its stowed state, pivot joints C, D, G, H, K and L will be at the lower folds and pivot joints A, B, E, F, I, J, M and N will be at the upper folds. The somewhat planar panels formed in the folded state will consist of areas bounded by sets of four points. These are A-B-D-C, C-D-F-E, E-F-H-G, G-H-J-I, I-J-L-K and K-L-N-M. Panels A-B-D-C, E-F-H-G and I-J-L-K fold with their left edges up and their right edges down. Panels C-D-F-E, G-H-J-I and K-L-N-M fold with their left edges down and their right edges up. For moderate positive-G flight loads the brace wires 22 are shown attached to pivot joints E, F, I, J, M and N, which would tend to open up from their rotation limit stops 46 due to wing lift. There are various combinations of pivot and folding orientations and brace wires possible while using the same basic components shown here FIG. 7 shows a deployed state of the segments 40 and FIG. 8 shows a time-lapse close-up of the left-most pair of panels in FIG. 7 (A-B-D-C and C-D-F-E from FIG. 6) during deployment. The two panels are initially in their stowed positions as indicated by the leftmost folded spar segment pair A-C and C-E. These start from the upper left pivot joint and connect to points near the arrows labeled C1 and E1. Upon exertion of a pulling force on the actuation cables 52 the torque forces generated about the spar segment pivot joints cause the wing 20 to deploy by straightening out the folded panels. As each increment of time passes in FIG. 8, the panels unfold as indicated by the various arrows. The first folded panel pivot joints (labeled C and D in FIG. 6) will travel through the range indicated by arrows C1–C5. Pulling on the actuation line 52 unfolds the segments 40 (A-C and B-D in FIG. 6) brings them into the extended position. The second folded panel's pivot joint (labeled E and F in FIG. 6) will travel through the range indicated by arrows E1–E5. By the time these pivots reach positions indicated by arrows C5 and E5, the brace wires 22 attached at pivot joints labeled E and F in FIG. 6 should be taut and bear loads. Similar unfolding will occur for the other panels in the wing structure.

With this wing 20, the present invention provides a reduction in stowed volume versus deployed volume, or an advantageous stowage volume shape, or both, versus traditional non-folding wing structures that are hinged or swivelled into the fuselage for stowage.

The present invention also provides an apparatus other than an aerial vehicle. Such an apparatus includes a beam 30 such as that described above having at least one segment that is rotatable about an axis that extends through a joint, a stop that limits the segment's angular range of rotation, and a flexible line connected to the beam that extends past the joint, whereby applying tension to the line will cause the segment to rotate about the axis until stopped by the stop.

The apparatus can include at least two spaced apart beams with multiple segments in each beam with at least one rib extending between the beams to form a frame. This frame can be covered by at least one layer of covering material to provide a continuous surface between elements of the frame, as is the case for the wing.

Although the invention has been shown and described with respect to an illustrated embodiment, equivalent alterations and modifications will occur to others skilled in the art upon reading and understanding the specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer that performs the specified function (i.e., that is functionally equivalent), even though not structurally equivalent to the disclosed structure that performs the function in the herein illustrated embodiments of the invention.

What is claimed is:

1. An articulated wing on an aerial vehicle, comprising:
    a frame that includes at least two spaced apart beams, each beam including a plurality of segments that are pivotably connected together at respective joints between adjacent segments for rotation about axes passing through the joints, a stop at each joint that limits the rotation of adjacent segments, and at least one rib spanning the distance between the beams;
    at least one flexible actuation line connected to each beam that extends past each joint such that applying tension to the line causes the segments to rotate and deploy the beam and thus the frame from a retracted position to an extended position; and
    a covering material extending over the frame that forms a substantially continuous surface.

2. A wing as set forth in claim 1, wherein each segment includes a guideway for the line.

3. A wing as set forth in claim 2, wherein the guideway includes a passage from one side of the segment to an opposite side of the segment.

4. A wing as set forth in claim 2, wherein the guideway includes a channel that extends parallel to the length of the segment.

5. A wing as set forth in claim 1, wherein at least one segment is symmetric.

6. A wing as set forth in claim 1, wherein the stop includes an integral part of at least one segment.

7. A wing as set forth in claim 6, wherein the stop is formed by elements of a joint, including portions of at least one of a pair of segments connected at the joint.

8. A wing as set forth in claim 1, wherein at least one stop allows a segment to rotate through a maximum of approximately one hundred-eighty degrees.

9. A wing as set forth in claim 1, wherein at least one stop allows a segment to rotate through a maximum of approximately ninety degrees.

10. An apparatus as set forth in claim 1, wherein at least one stop allows a segment to rotate in an opposite direction from the direction of rotation for an adjacent segment.

11. A wing as set forth in claim 1, wherein the flexible line includes at least one cable.

12. A wing as set forth in claim 1, wherein the at least one rib is attached to the covering material.

13. A wing as set forth in claim 1, wherein the covering material is flexible.

14. An aerial vehicle, comprising a wing assembly including at least one wing as set forth in claim 1, a fuselage, and a plurality of braces extending between the wing and the fuselage that support the wing in at least one position.

15. An apparatus as set forth in claim 14, wherein the braces include cables.

16. A missile having a fuselage and an articulated wing mounted to and extendable from the fuselage, the wing including a pair of beams, each beam having a plurality of segments that are pivotably connected together at respective joints between adjacent segments for rotation about axes passing through the joints, a stop at each joint that limits the rotation of adjacent segments, a flexible actuation line that extends past each joint and is connected to the beam such that applying tension to the line causes the segments to rotate and deploy the beam from a retracted position to an extended position, a plurality of ribs spanning the distance between the segments, and a covering material extending over the segments and ribs that forms a substantially continuous surface.

\* \* \* \* \*